No. 741,997. PATENTED OCT. 20, 1903.
W. BECKWITH.
MUD GUARD FOR BICYCLES.
APPLICATION FILED JULY 18, 1903.
NO MODEL. 2 SHEETS—SHEET 1.

WITNESSES.
A. N. B. Emery.
A. K. Hood.

INVENTOR.
William Beckwith
By his Att'y
Henry W. Williams

No. 741,997. PATENTED OCT. 20, 1903.
W. BECKWITH.
MUD GUARD FOR BICYCLES.
APPLICATION FILED JULY 18, 1903.
NO MODEL. 2 SHEETS—SHEET 2.
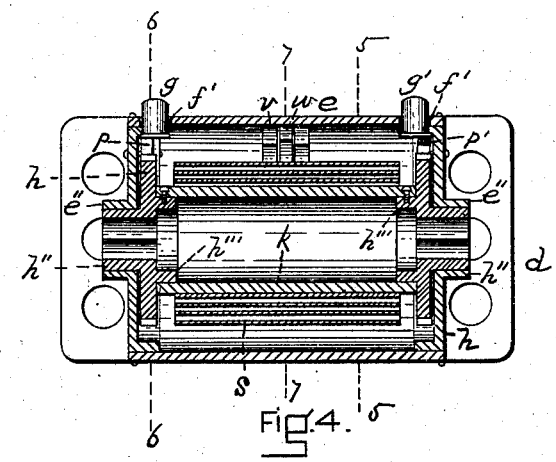
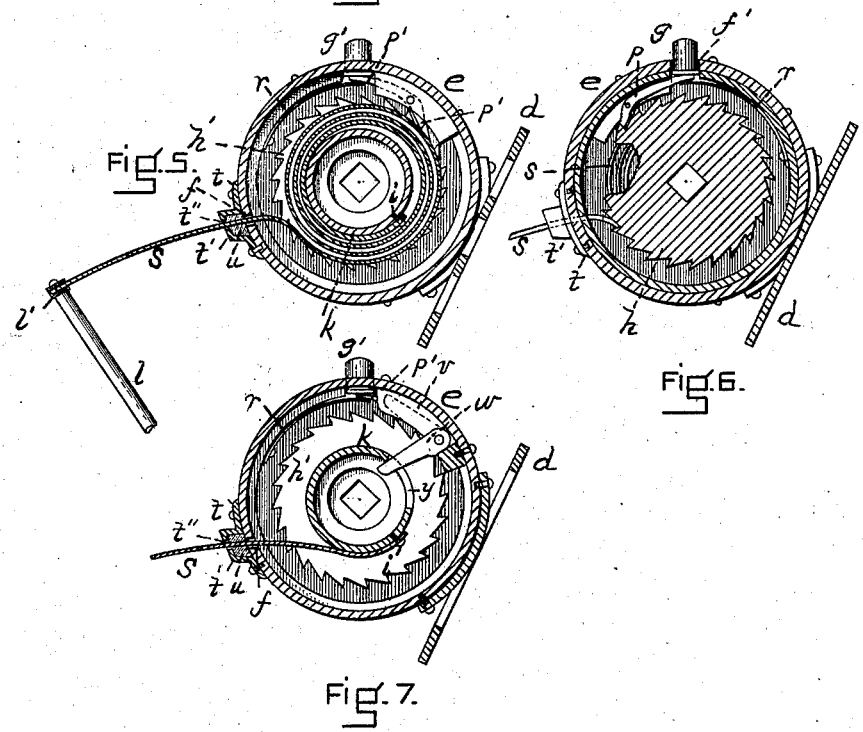
WITNESSES.
A. N. P. Emery.
A. K. Hood.
INVENTOR.
William Beckwith
By his Atty.

No. 741,997. Patented October 20, 1903.

UNITED STATES PATENT OFFICE.

WILLIAM BECKWITH, OF LOWELL, MASSACHUSETTS, ASSIGNOR OF ONE-THIRD TO WILLIAM M. RUSHWORTH, OF LOWELL, MASSACHUSETTS.

MUD-GUARD FOR BICYCLES.

SPECIFICATION forming part of Letters Patent No. 741,997, dated October 20, 1903.

Application filed July 18, 1903. Serial No. 166,113. (No model.)

*To all whom it may concern:*

Be it known that I, WILLIAM BECKWITH, a subject of the King of Great Britain, residing in Lowell, in the county of Middlesex and State of Massachusetts, have invented a new and Improved Mud-Guard for Bicycles, of which the following is a specification.

It is the object of this invention to provide a mud-guard for the rear wheel of a bicycle which will be neat in appearance, light in weight, in which the ribbon or guard proper can be rolled up out of sight when not in use and readily unrolled for use, which is self-cleaning, and which is efficient in operation.

The nature of the invention is fully described in detail below and illustrated in the accompanying drawings, in which—

Figure 1:
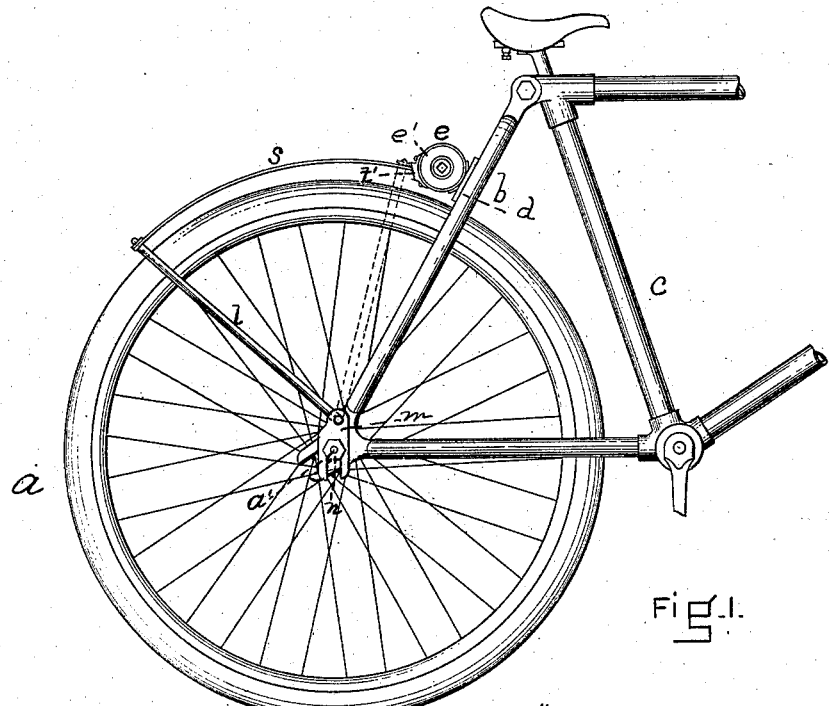
Figure 2:
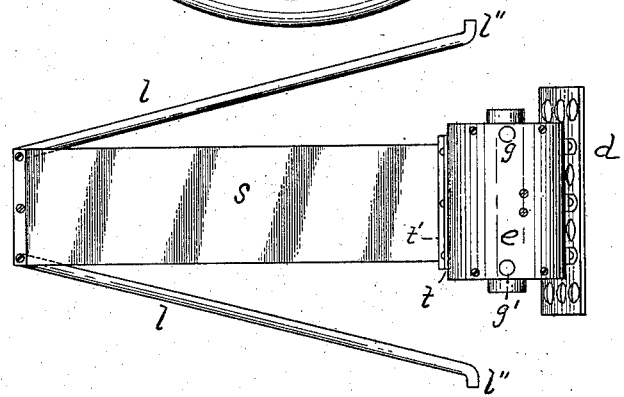
Figure 3:
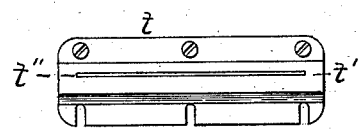

Figure 1 is a side view of the rear wheel and a portion of the frame of a bicycle with my mud-guard attached. Fig. 2 is a top view or plan of the guard removed. Fig. 3 is a detached view, enlarged, of the plate which operates to render the guard self-cleaning. Fig. 4 is a longitudinal vertical section taken through the case, drum, and ribbon, with the ribbon rolled up within the case. Fig. 5 is a cross-section taken on line 5, Fig. 4, looking to the right. Fig. 6 is a similar section taken on line 6, Fig. 4. Fig. 7 is a similar section taken on line 7, Fig. 4, with the ribbon unrolled.

Similar letters of reference indicate corresponding parts.

$a$ represents the rear wheel of a bicycle, $b$ being the rear fork and $c$ the frame.

$d$ represents a plate which is secured by suitable screws to the two portions of the fork $b$, stretching horizontally from one portion to the other at a point a little above the path of the tire of the wheel. Rigid with this plate is a horizontally-disposed cylindrical case $e$, provided with a longitudinal slot or slit $f$ and with suitable openings $f'$ for the accommodation of push-buttons $g$ $g'$, the purpose of which is below described. The end walls $e'$ of the case are formed outward into bearings $e''$ for the hollow trunnions or hubs $h''$ which extend outward from ratchet-wheels $h$ $h'$, the teeth on which project in opposite directions. (See Figs. 6 and 7.) These hubs are squared internally in order to receive a suitable winding-key. The ratchet-wheels, which are at opposite ends of the case, are provided with inwardly-extending annular flanges $h'''$, by means of which they support the opposite ends of a drum $k$. Winding around this drum is a metallic ribbon $s$, one end of said ribbon being secured at $i$ to the drum and the other end being attached to the upper end or cross-piece $l'$ of a spreading-frame $l$, (made preferably of heavy wire,) whose lower ends are bent outward at $l''$, whereby they may be pivotally held in corresponding holes in two yoke-shaped plates $m$, Fig. 1, which drop over the axle $a'$ of the rear wheel and are held in place on opposite sides of the wheel by nuts $n$, which can be tightened, and thus hold the frame $l$ firmly. This ribbon extends through the narrow slot $f$ in the case and is broad enough to receive all flying mud or other matter from the wheel and effectually protect the rider. It is also of sufficient length to act as an efficient mud-guard and to be allowed to assume a curvature which corresponds with that of the wheel.

$p$ $p'$ are pawls pivotally supported in the case and adapted to be moved into engagement with the ratchets $h$ and $h'$, respectively, by the push-buttons $g$ and $g'$, said pawls being held normally out of such engagement by suitable springs $r$. As the teeth on the ratchet-wheel $h$ project in the opposite direction from those on the wheel $h'$, it is evident that when the push-buttons and pawls are in their normal position both wheels are engaged and the guard-ribbon $s$ can neither be withdrawn nor wound.

In operation the ribbon-guard being wound up, as in Fig. 4, to unwind it and use it as a mud-guard the push-button $g$ is pressed, thus depressing the outer end of the pawl $p$ and lifting said pawl out of engagement with the ratchet $h$. By applying a suitable key to one of the hubs of the drum the ribbon is unwound into the position indicated in Fig. 1, the frame $l$ swinging into the position shown in said figure. To wind up the guard-ribbon, the push-button $g'$ is pressed, releasing the ratchet-wheel $h$, and the winding-tool applied again to the drum. When the ribbon has been wound up, the ratchet $h$ operates to hold it in position, and when the ribbon is unwound the ratchet $h'$ operates to hold it in position, the other ratchet slipping.

Secured to the case next and around the slot $f$ is a plate $t$, which is formed up at $t'$, as shown in Figs. 3, 5, 6, and 7, thus producing a long chamber, which is filled with rubber or other cleaning substance $u$. This portion $t'$ is also provided with a slot $t''$, which corresponds with a slot in the case. As the ribbon is being withdrawn and wound around the drum the edges of the slot $t''$, (which is very narrow,) in connection with the rubber packing $u$, effectually clean both sides of the ribbon, so that practically no mud or dirt is carried into the case.

Secured to the inner surface of the case between the ratchets is a small frame or bracket $v$, to which is loosely pivoted a dog $w$, Figs. 4 and 7. The drum is provided centrally with a slot $y$, which is of course covered when the ribbon is wound upon the drum. As the dog $w$ is pivoted to a portion of the case which is above the center, when the ribbon has become unwound the dog drops by gravity until its free end falls into the slot $y$ (see Fig. 7) and locks the drum, so that it cannot become accidentally or maliciously rotated in a manner to tear off or injure the ribbon.

When the guard is in position, it is not unornamental in appearance, and when the ribbon is wound the guard is hardly noticeable.

Having thus fully described my invention, what I claim, and desire to secure by Letters Patent, is—

1. A mud-guard for bicycles, comprising a case adapted to be secured to the fork, said case being provided with a longitudinal slot; reverse ratchet-wheels mounted in the case near its opposite ends; a drum supported by said ratchet-wheels; a swinging frame pivotally sustained at its lower end by the machine; a ribbon secured at one end to said drum, extending through the slot in the case and secured at the other end to said frame; mechanism for winding said ribbon into the case around the drum and unwinding it therefrom; and mechanism for holding the ratchet-wheels alternately as the ribbon is wound and unwound, substantially as set forth.

2. In a mud-guard for bicycles, the case $e$ supported by the fork and provided with openings at its opposite ends and with the longitudinal slot $f$; the reverse ratchet-wheels $h$ $h'$ mounted in the case and provided with the hollow hubs $h''$; pawls supported by a case and held normally in engagement with said ratchets; push-buttons supported by the case and adapted to force said pawls out of such engagement; brackets or plates supported by the axle of the rear wheel; the frame $l$ pivotally connected at its lower ends with said plates; and the ribbon-guard $s$ extending from the upper end of said frame, through the case to the drum therein, substantially as described.

3. In a mud-guard for bicycles, the case $e$ provided with the longitudinal slot $f$; a rotative drum sustained in said case; a plate secured to the outer surface of the case at said slots, said plate being formed with a slot coincident with said slot $f$, and said plate being further formed up and thereby provided with a chamber adapted to contain a suitable packing; a guard-ribbon extending from said drum through the slot $f$ therein, said packing, and the slot in said plate; a frame supported by the bicycle and adapted to sustain the outer or rear end of the guard-ribbon beyond the tire; and means for winding said ribbon around and unwinding it from said drum and drawing it through said slots, substantially as set forth.

4. In a mud-guard of the character described, the case $e$; the drum $k$ mounted therein and provided with the slot $y$; the locking-pawl $w$ mounted in the case and adapted to fall into said slot in the drum when the drum is bare; a guard-ribbon extending from said drum through the case; and means supported by the bicycle for sustaining the opposite end of said ribbon, substantially as described.

In testimony whereof I have signed my name to this specification in the presence of two subscribing witnesses.

WILLIAM BECKWITH.

Witnesses:
SYLVESTER JACKSON,
WILLIAM A. HOGAN.